United States Patent Office 2,864,872
Patented Dec. 16, 1958

2,864,872

CRACKING OF 1,1-DIARYLETHANES TO SUBSTITUTED STYRENES

Kenneth W. Saunders, Darien, and Edwin M. Smolin, Stamford, Conn., assignors to American Cyanamid Company, New York, N. Y., a corporation of Maine No Drawing. Application May 1, 1956
Serial No. 581,826

10 Claims. (Cl. 260—650)

This invention relates to the decomposition of diarylalkane having at least two carbon atoms in the alkane chain and having aryl substituents attached to one of said carbon atoms. More particularly, this invention relates to a novel catalyst and method to give improved results in the catalytic conversion of 1,1-diarylethanes to substituted styrenes.

In accordance with our invention, greater catalytic conversion per pass of diarylethanes can be obtained with no increase in the amounts of undesirable by-products formed. Thus, the size of recycling equipment is reduced and the entire equipment expenditure is materially lowered.

The invention comprises replacing sodium silicate heretofore employed as a binder in the preparation of sprayed kaolin-on-inert-carrier-type catalysts with a similar percentage of silica prepared by a hydrolyzed alkyl ortho silicate, such as ethyl ortho silicate.

We have found that by forming an aqueous slurry of a preferred catalyst material, such as colloidal kaolin, and adding the silica binder obtained by freshly hydrolyzing an organic ester of silicic acid, such as ethyl silicate, and thereafter either spraying this slurry on an inert carrier such that a surface layer of from about 3% to 50% of the weight of the resulting catalyst structure is contributed by kaolin, or by forming pellets from the slurry, and thereafter baking the catalyst at a temperature of from about 350° C. to 550° C., a superior catalyst providing substantially improved conversions in the cracking of 1,1-diarylethane to substituted styrenes is possible.

It is an object of this invention to provide a catalyst and process wherein the rate of catalytic conversion of diarylethane per pass can be increased without the undesirable increase in by-product formation. This and other objects are attained by contacting a substance of the class consisting of paraffins having at least two aryl substituents attached to the same carbon atom of the paraffin chain with a kaolin catalyst prepared with a binder comprising $SiO_2$.

In the cracking reaction of unsymmetrical diarylethanes, it is preferable that the contact time of the diarylethane in the presence of the catalyst be less than 0.4 second, while it is generally desirable to employ contact time of at least 0.004. The slurry containing the mixture of organic silicon as binder and kaolin may be formed into pellets or the slurry may itself be sprayed on a carrier. The carrier may be granular or in the form of rings, cylinders, saddles, helices, grids, etc. It has been found that the amount of catalyst applied to the carrier as a surface layer should be sufficient to completely cover the exterior surface of the carrier with at least one layer of catalyst in order to convert as much of the diaryl-substituted paraffin as possible. In order to avoid having the catalyst foul and in order to minimize the production of ethyl benzenes corresponding to the styrenes being produced, the catalyst coating should be less than about 1 mm. and preferably no thicker than the calculated average thickness of a coating having 3 layers of catalyst particles. In general, we have found that the coating should preferably be between 0.01 mm. and 1 mm. in thickness.

Metallic silicate catalyst binders such as sodium silicate as catalysts in the catalytic decomposition of diarylethanes are known, see, for example, Sturrock and Lawe, U. S. Patent No. 2,519,719; however, so far as we know, the use of organic esters for this purpose have not been employed. As will hereinafter be more fully apparent, the use of these silicon containing organic esters as binder for the catalyst results in a catalyst of substantial superiority for use in the manufacture of diarylethane decomposition products. In the examples which follow, the method for making both a conventional catalyst and one employing an organic silicate binder is set forth. The comparative results obtained for each illustrates the advantage when the catalyst of the invention is employed.

PREPARATION OF CATALYST

2% sodium silicate catalyst preparation ($Na_2SiO_3$)

To a suspension of 130 parts of N. F.[1] colloidal kaolin in 500 parts water is added 1.3 parts of sodium silicate as $Na_2SiO_3$. The suspension is sprayed onto 475 parts of ¼ by ¼ inch aluminum oxide cylindrical pellets, the final weight of coating after baking the catalyst at 450° C. is 14%, of which 1.9% is calculated to be sodium silicate.

2% silica catalyst preparation ($SiO_2$)

To a suspension of 150 parts of N. F. colloidal kaolin in 500 parts of water is added 7.6 parts of the hydrolysate from 8 parts of 5% hydrochloric acid and 40 parts of ethyl ortho silicate which corresponds to 1.8 parts of free $SiO_2$. The suspension is sprayed onto 600 parts of ¼ by ¼ inch aluminum oxide cylindrical pellets, the final weight of coating after baking the catalyst at 450° C. is 16%, of which 2.1% is calculated to be silica.

Comparative data employing these catalysts is set forth in Examples 1 to 8 in the table below. All cracking runs are carried out at a collision frequency factor of 0.5. The collision frequency factor (C. F. F.) is defined by the following expression:

$$C. F. F. = \frac{P \times Vc}{d \times Vg}$$

wherein P equals total pressure in atmospheres; $Vg$ equals volume space velocity of vapor going through the reactor in 1 second; $Vc$ equals total apparent volume of catalyst; and $d$ equals average diameter of individual catalyst particles in centimeters.

The procedure followed for these runs is as follows: The catalyst is packed into a tube which is heated to a temperature within the range of about 475° C. to 540° C. The ditolylethane is vaporized and preheated to the above reaction temperature and thereafter is admixed with water vapor as a diluent, at temperature of at least as high as the above reaction temperature range to a molar dilution of 35:1 or 100:1, as set forth in the table. This mixture is passed through the heated tube at a suitable rate, as defined by the collision frequency factor. The reaction mixture is condensed and recovered; the water and hydrocarbon layers are separated and the hydrocarbon layer is flash distilled to separate the low boiling constituents, toluene and methylstyrene, from the uncracked ditolylethane and tars.

[1] National Formulary.

| Example | Catalyst Binder, Percent | Dilution with Steam During Cracking, Molar (Mols of water per mol of DTE) | Conversion of DTE at Lbs. DTE Fed Per Lb. Catalyst | | | | Mols Percent Et. Tol. in Tol. and Me. Sty. |
|---|---|---|---|---|---|---|---|
| | | | 0.5 | 1.0 | 1.5 | 2.0 | |
| 1 | 2% Na₂SiO₃ | 35 | 50 | 44 | 40.5 | 38 | 1.25 |
| 2 | 2% SiO₂ | 35 | 65 | 55.5 | 50.0 | 46.5 | 1.26 |
| 3 | 2% Na₂SiO₃ | 100 | 54.5 | 48 | 43 | 39 | 1.27 |
| 4 | 2% SiO₂ | 100 | 77 | 68.5 | 62 | 56.5 | 1.25 |
| 5 | 5% Na₂SiO₃ | 35 | 44.5 | 38 | 34.5 | 32 | 1.28 |
| 6 | 5% SiO₂ | 35 | 63 | 53 | 47.5 | 43.5 | 1.27 |
| 7 | 5% Na₂SiO₃ | 100 | 47 | 41 | 37 | 35 | 1.31 |
| 8 | 5% SiO₂ | 100 | 76 | 67.5 | 61.5 | 56 | 1.29 |

DTE—Ditolylethane.
Et. Tol.—Ethyltoluene.
Tol.—Toluene.
Me. Sty.—Methylstyrene.

The advantages obtained by the invention are also illustrated by the following diagram employing data, i. e., column 3, from the table.

FIGURE I.—EFFECT OF CATALYST BINDER ON CRACKING CONVERSION OF DTE

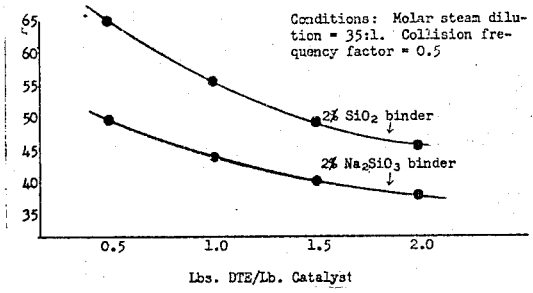

Hydrated siliceous catalysts, including the hydrated aluminum silicate, may be used in our process. The aluminum silicates are particularly effective, and especially those which have relatively high ratios of silica to alumina.

The reaction temperature during the catalytic decomposition may be varied from about 350° C. up to 600° C., or even higher, in some cases.

As previously noted, it is preferable that the contact time of diarylethane and catalyst be between about 0.004 second and 0.4 second; especially good results are obtained when this contact time is between about 0.04 second and 0.1 second.

Any material which is volatile, and which does not react with the diarylethane may be used as a diluent, such as steam, nitrogen, hydrogen, carbon monoxide, and various hydrocarbons, such as methane, ethane, and benzene, provided, also, that such diluent does not react with the products formed by decomposition of the diarylethane. The molar ratio of the diluent to the diaryl hydrocarbon in the feed may be varied widely, i. e., from as low as 1:2 to 300:1, or even higher. Generally, it has been found that the optimum range is between about 10:1 and 100:1.

The calculation of the contact time of the vapor, i. e., diarylethane and diluent, with the catalyst is a relatively complex matter, and in order to simplify this calculation, we have used the term "contact time" herein to mean those values which are computed on the assumption that the catalyst contains 50% voids and neglecting both the pressure drop through the catalyst and the increase in volume which occurs during the reaction.

We prefer to employ the shortest possible contact time consistent with a substantial conversion of the diarylethane to a relatively pure vinyl aromatic compound together with a similar proportion of an aromatic compound containing no vinyl group. We have found in order to avoid fouling of catalyst that it is frequently desirable not to exceed a conversion in the range of about 40%–60% of the diarylethane fed to the catalyst in one pass and by recirculating the unconverted diarylethane from one to five times or more, a high yield is obtained very economically.

One of the advantages of employing a short contact time with the catalyst of the reacting material is that the life of the catalyst is prolonged. With contact times of the order of 1 second or more, the catalyst becomes fouled in a relatively short period of time, due to the deposition of carbonaceous materials on the surface of the catalyst. When it is necessary or desirable to reactivate the catalyst, this may be done by passing heated air, preferably mixed with steam, through the catalyst. The temperature of the air and steam mixture should be raised to about 590° C. to 650° C. The air enables the carbon to burn, whereas the steam which is used in conjunction with the air keeps the temperature from rising too high, which might cause a reduction in the activity of the catalyst. Generally at temperatures of about 590° C. the carbon begins to burn off and the heat of this reaction causes the temperature to rise to about 650° C., say, without the application of any external heat. A coated catalyst is preferred over a pelleted kaolin catalyst, since it results in the deposition of much less carbon and its active life is therefore much longer. Accordingly, the time of reactivation is shortened. Therefore, the useful part of the catalyst cycle is increased in two ways, i. e., by increasing the time of its active life and by decreasing the time required for its reactivation.

It may be seen that the proximity of the reactivation temperature to the reaction temperature greatly simplifies the change from normal operation to reactivation and back to normal operation. Since the normal highly active life of the catalyst greatly exceeds the time required for its reactivation in this manner, the operation of two or more converters in parallel is readily accomplished. The short time of reactivation enables one to keep one or more converters in normal operation while one or more other converters are being reactivated.

Our process may be operated at elevated or reduced pressure, and under some conditions, it is particularly advantageous to operate under reduced pressure. If the diarylethane which is to be decomposed is not readily volatile at ordinary pressure, reduced pressures may be used, thereby facilitating the operation of our process.

In addition to hydrolyzed ethyl ortho silicate as the catalyst binder according to the invention, other hydrolyzed alkyl ortho silicate ester binders are such as methyl, propyl, or butyl ortho silicates, and the like may be used. Catalysts which may be effectively employed with these binders are preferably those described, such as kaolin, i. e., aluminum silicates generally of the formula $$Al_2O_3 \cdot 2H_2O \cdot 2SiO_2$$

The following are illustrative of the aliphatic compounds having two aryl substituents attached to the same carbon atom thereof which may be converted into the mono-nuclear aromatic compounds in accordance with the present invention: 1-phenyl-1-tolyl ethane, each of the 1,1-ditolyl ethanes, each of the 1-phenyl-1-xylyl ethanes, each of the 1-tolyl-1-xylyl ethanes, each of the 1,1-dixylylethanes, 1,1-diphenyl propane, each of the 1-phenyl-1-tolyl propanes, each of the 1,1-ditolyl propanes, each of the 1-tolyl-1-xylyl propanes, each of the 2,2-ditolyl propanes, each of the 1,1-bis-(monochlorophenyl)-ethanes, each of the 1,1-bis-[p,p'-di(chlorophenyl)]ethane, each of the 1,1-bis-(monohydroxy phenyl)ethanes, each of the 1,1-dicresyl ethanes, each of the 2,2-dicresyl propanes, each of the 1,1-dinaphthyl ethanes, each of 1,1-dixenyl ethanes, each of the 1-tolyl-1-naphthyl ethanes, and the like and their nuclear substituted halogen, hydroxyl and other derivatives, all of which are volatile at the temperature and pressure used in the process. Those substances containing tolyl, xylyl, cresyl, xenyl, monochlorophenyl and dichlorophenyl groups may be attached to the carbon atom of the paraffin chain at the ortho, meta, or para positions and when two of these groups are present, they may be attached in the same or different positions.

It will be apparent that various modifications are possible within the scope of the instant invention, and any enumeration of specific details is not intended to limit the invention, except as defined in the appended claims.

We claim:
1. A catalyst for cracking 1,1-diarylethanes into mononuclear vinyl aromatic compounds comprising kaolin alumina-silicate and a hydrolyzed alkyl ortho silicate ester binder said catalyst having been subjected to baking at a temperature of from about 350° C. to 550° C.
2. The catalyst of claim 1 wherein the binder is hydrolyzed ethyl ortho silicate.
3. In a method of producing mononuclear vinyl aromatic compounds, the step which comprises catalytically decomposing a 1,1-diarylethane in the presence of kaolin, containing as a binder therefor, a hydrolyzed alkyl ortho silicate said kaolin and said binder having been subjected to baking at a temperature of from about 350° C. to 550° C.
4. The method of claim 3 wherein the binder is hydrolyzed ethyl ortho silicate.
5. In a method of producing methylstyrene, the step which comprises catalytically decomposing 1,1-ditolylethane in the presence of kaolin, containing as a binder, therefor, a hydrolyzed alkyl ortho silicate, said kaolin and said binder having been subjected to baking at a temperature of from about 350° C. to 550° C.
6. The method of claim 5 wherein the binder is ethyl ortho silicate.
7. In a method of producing dimethylstyrene, the step which comprises catalytically decomposing 1,1-dixylylethane in the presence of kaolin, containing as a binder, therefor, a hydrolyzed alkyl ortho silicate said kaolin and said binder having been subjected to baking at a temperature of from about 350° to 550° C.
8. The method of claim 7 wherein the binder is ethyl ortho silicate.
9. In a method of producing chlorostyrene, the step which comprises catalytically decomposing 1,1-bis[p,p'-di(chlorophenyl)]ethane in the presence of kaolin, containing as a binder, therefor, a hydrolyzed alkyl ortho silicate said kaolin and said binder having been subjected to baking at a time of from about 350° C. to 550° C.
10. The method of claim 9 wherein the binder is ethyl ortho silicate.

References Cited in the file of this patent
UNITED STATES PATENTS

| | | |
|---|---|---|
| 2,519,719 | Sturrock et al. | Aug. 22, 1950 |
| 2,695,893 | Houdry | Nov. 30, 1954 |